United States Patent
Athley et al.

(10) Patent No.: US 10,673,512 B2
(45) Date of Patent: Jun. 2, 2020

(54) PRECODING OVER A BEAM SUBSET

(71) Applicant: Telefonaktiebolaget LM Ericsson (publ), Stockholm (SE)

(72) Inventors: Fredrik Athley, Kullavik (SE); Nima Seifi, Solna (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 122 days.

(21) Appl. No.: 15/521,953

(22) PCT Filed: Sep. 16, 2015

(86) PCT No.: PCT/EP2015/071246
§ 371 (c)(1),
(2) Date: Apr. 26, 2017

(87) PCT Pub. No.: WO2017/045713
PCT Pub. Date: Mar. 23, 2017

(65) Prior Publication Data
US 2017/0331544 A1    Nov. 16, 2017

(51) Int. Cl.
*H04B 7/0417* (2017.01)
*H04B 7/06* (2006.01)
*H01Q 21/22* (2006.01)

(52) U.S. Cl.
CPC ......... *H04B 7/0695* (2013.01); *H04B 7/0417* (2013.01); *H04B 7/063* (2013.01);
(Continued)

(58) Field of Classification Search
CPC .. H01Q 21/225; H04B 7/0417; H04B 7/0617; H04B 7/063; H04B 7/0639; H04B 7/0695
See application file for complete search history.

(56) References Cited

U.S. PATENT DOCUMENTS

| 2007/0054623 A1* | 3/2007 | Sato | H04B 7/0617 455/67.11 |
| 2009/0298509 A1* | 12/2009 | Hoshino | H04B 7/0408 455/452.2 |

(Continued)

FOREIGN PATENT DOCUMENTS

WO    2015080645 A1    6/2015

OTHER PUBLICATIONS

International Search Report and Written Opinion issued in Application No. PCT/EP2015/071246 dated May 25, 2016, 15 pages.
(Continued)

*Primary Examiner* — Asad M Nawaz
*Assistant Examiner* — Zhaohui Yang
(74) *Attorney, Agent, or Firm* — Rothwell, Figg, Ernst & Manbeck, P.C.

(57) ABSTRACT

There is provided mechanisms for precoding over a beam subset. A method is performed by a network node. The method comprises exchanging reference signal information for a set of transmission beams or set of antenna ports with a wireless device. The method comprises acquiring, based on the reference signal information, information regarding which proper subset of transmission beams from the set of transmission beams to use for communication with the wireless device. The method comprises determining precoding weights for the proper subset of transmission beams or antenna ports based on the reference signal information.

35 Claims, 7 Drawing Sheets

(52) U.S. Cl.
CPC ......... *H04B 7/0617* (2013.01); *H01Q 21/225* (2013.01); *H04B 7/0639* (2013.01)

(56) References Cited

U.S. PATENT DOCUMENTS

| | | | |
|---|---|---|---|
| 2010/0202560 A1* | 8/2010 | Luo | H04B 7/0691 375/295 |
| 2011/0249588 A1* | 10/2011 | Petersson | H04B 7/0417 370/252 |
| 2013/0201938 A1* | 8/2013 | Seol | H04W 72/1284 370/329 |
| 2014/0226515 A1* | 8/2014 | Kishiyama | H04W 24/08 370/252 |
| 2014/0286202 A1* | 9/2014 | Song | H04B 7/0604 370/278 |
| 2014/0293944 A1* | 10/2014 | Kim | H04W 72/042 370/329 |
| 2014/0334566 A1* | 11/2014 | Kim | H04B 7/0469 375/267 |

OTHER PUBLICATIONS

Bengtsson, M., et al., "D1.4 Initial Report on Advanced Multiple Antenna Systems", Wireless World Initiative New Radio-Winner+, vol. Final 1.0, Jan. 16, 2009, pp. 1-110, XP008113535.

Schwarz, Stefan, et al., "Exploring Coordinated Multipoint Beamforming Strategies for 5G Cellular", IEEE Access, vol. 2, Aug. 29, 2014, pp. 930-946, XP011558545.

* cited by examiner

PRECODING OVER A BEAM SUBSET

CROSS-REFERENCE TO RELATED APPLICATION(S)

This application is a 35 U.S.C. § 371 National Phase Entry Application from PCT/EP2015/071246, filed Sep. 16, 2015, and designating the United States.

TECHNICAL FIELD

Embodiments presented herein relate to precoding over a beam subset, and particularly to methods, a network node, a wireless device, computer programs, and a computer program product for precoding over a beam subset.

BACKGROUND

In communications networks, there may be a challenge to obtain good performance and capacity for a given communications protocol, its parameters and the physical environment in which the communications network is deployed.

For example, transmit (Tx) beamforming, or precoding, is a mechanism that can improve performance in wireless networks by focusing the transmitted energy in space. Beamforming can be implemented with array antennas using analog or digital beamforming or a combination thereof. In line-of-sight (LoS) channels the signals on different antenna elements will be correlated. Ideally, assuming a single planar wavefront and a narrowband signal, M antenna elements can be phase aligned to coherently combine the signal in a desired direction giving a beamforming gain of a factor of M. This corresponds to a pencil beam pointing in the desired direction.

In many channels there will not be any LoS component. The information transfer then relies upon multipath propagation. Generally, multipath propagation will decorrelate the signals on different antenna elements which will reduce the beamforming gain if conventional beamforming is used. However, if channel state information (CSI) is available at the transmitter, multipath propagation paths can be combined coherently by proper amplitude and phase weighting on each antenna element. In this way, full beamforming gain can be achieved also in multipath propagation conditions. More precisely, the beamforming weights that can achieve this are given by $$w = ch^H \qquad (1)$$

where w is the unit-norm beamforming weight vector, c is a scalar normalization constant, h is the channel response vector between the antenna array at the radio access network node and the antenna at the wireless device served by the radio access network node, and $^H$ denotes complex conjugate transpose. It is here assumed that the wireless device comprises a single antenna element for communicating with the radio access network node. This particular choice of beamforming weights is often referred to as maximum ratio transmission (MRT) or matched filter (MF) precoding.

In a pure LoS channel with a single planar wavefront and assuming a uniform linear array (ULA) at the radio access network node, the m:th element in the channel vector is given by $$h_m = \exp(-j2\pi m d \sin \phi)$$

where d is the antenna element spacing measured in wavelengths and $\phi$ is the angle-of-departure (AoD) to the user equipment (UE). Hence, in sin $\phi$ space, the channel vector is simply a discrete Fourier transform (DFT) vector. Beamforming using DFT weight vectors will be referred to as DFT beamforming.

Massive beamforming is foreseen as a candidate component for the next generation cellular communications system, denoted 5G. In general terms, massive beamforming implies that the radio access network node is equipped with antenna arrays with a large number of antenna elements, orders of magnitudes larger than used in current radio access network nodes. This is expected to mitigate the increased propagation loss when operating in the new, higher frequency bands that are considered for the proposed so-called 5G telecommunications standard. This mitigation is foreseen to be achieved by the high beamforming gain that could be obtained with large antenna arrays. Generally, the high beamforming gain may be achieved by DFT beamforming if there is LoS or MRT if there is no LoS.

If Tx/receive (Rx) reciprocity cannot be assumed, the CSI needs to be obtained by feedback from the wireless device. Reciprocity cannot typically be assumed for frequency-division duplex (FDD) systems due to the frequency difference between the Tx and Rx bands. Another cause of non-reciprocity is that the Tx and Rx branches may not have the same characteristics.

The CSI needed for DFT beamforming relates to the AoD to the wireless device. This can be estimated by enabling the radio access network node transmit reference signals in a number of hypothesized AoDs and enabling the wireless device to report the estimated direction that gives the maximum received power for the wireless device. This may be performed by having a fixed grid-of-beams (GoB) at the radio access network node and associate each beam in the grid with a unique reference signal sequence. Each beam in the grid may be a DFT beam and the beam grid may span the angular coverage of the cell defined by the region in which the radio access network node provides service. The wireless device is then configured to measure the reference signal received power (RSRP) of each beam and reports this (for a number of beams or only the best beam, i.e., the beam with highest RSRP) back to the radio access network node.

An alternative approach to obtain the CSI is that the wireless device instead has access to information regarding which beams that are available in the GoB; this set of beams is commonly referred to as a codebook. By the radio access network node transmitting pilot sequences on each antenna port, the wireless device will be able to estimate the entire channel h and based on this the wireless device will further be able to recommend one, or multiple, of the beams within the GoB. This information can then be fed back from the wireless device to the radio access network node.

For MRT full channel knowledge, i.e., the amplitude and phase of each channel coefficient, is needed at the radio access network node. For a non-reciprocal system this implies that the wireless device needs to report amplitude and phase of each channel coefficient back to the radio access network node.

However, there are still some issues with massive beamforming, particularly for massive beamforming used in non-LoS (NLoS) channels. As a first example, DFT beamforming as described above does not yield full beamforming gain in NLoS channels. If the channel angular spread at the radio access network node is larger than the beamwidth of the DFT beams in the GoB, significant loss in beamforming gain will occur. With large arrays the beamwidth is very small which means that even a small angular spread will lead to loss in beamforming gain. As a second example, MRT may achieve full beamforming gain regardless of the channel angular spread, but the feedback overhead resulting from the needed CSI is prohibitive for large arrays.

Hence, there is still a need for improved precoding for massive beamforming.

SUMMARY

An object of embodiments herein is to provide efficient precoding for massive beamforming.

According to a first aspect there is presented a method for precoding over a beam subset. The method is performed by a network node capable of exchanging reference signal information for a set of transmission beams and a set of antenna ports. The method comprises exchanging reference signal information for the set of transmission beams or the set of antenna ports with a wireless device. The method comprises acquiring, based on the reference signal information, information regarding which proper subset of transmission beams from the set of transmission beams to use for communication with the wireless device. The method comprises determining precoding weights for the proper subset of transmission beams based on the reference signal information.

Advantageously this provides efficient precoding for massive beamforming.

Advantageously this enables close to full beamforming gain in NLoS channels with acceptable feedback overhead.

Advantageously this enables the required baseband resources and radio resources to be reduced compared to a full-dimensional digital system.

According to a second aspect there is presented a network node for precoding over a beam subset. The network node comprises processing circuitry nd is capable of exchanging reference signal information for a set of transmission beams and a set of antenna ports. The processing circuitry is configured to cause the network node to perform a set of operations. The processing circuitry is configured to cause the network node to exchange reference signal information for the set of transmission beams or the set of antenna ports with a wireless device. The processing circuitry is configured to cause the network node to acquire, based on the reference signal information, information regarding which proper subset of transmission beams from the set of transmission beams to use for communication with the wireless device. The processing circuitry is configured to cause the network node to determine precoding weights for the proper subset of transmission beams based on the reference signal information.

According to a third aspect there is presented a computer program for precoding over a beam subset, the computer program comprising computer program code which, when run on processing circuitry of a network node, causes the network node to perform a method according to the first aspect.

According to a fourth aspect there is presented a method for precoding over a beam subset. The method is being performed by a wireless device. The method comprises exchanging reference signal information for a set of transmission beams or a set of antenna ports with a network node capable of exchanging reference signal information for the set of transmission beams and the set of antenna ports. The method comprises receiving data transmission from the network node in a proper subset of transmission beams from the set of transmission beams, the proper subset of transmission beams being based on the reference signal information and using precoding weights being based on the reference signal information.

According to a fifth aspect there is presented a wireless device for precoding over a beam subset. The wireless device comprises processing circuitry. The processing circuitry is configured to cause the wireless device to perform a set of operations. The processing circuitry is configured to cause the wireless device to exchange reference signal information for a set of transmission beams or a set of antenna ports with a network node capable of exchanging reference signal information for the set of transmission beams and the set of antenna ports. The processing circuitry is configured to cause the wireless device to receive data transmission from the network node in a proper subset of transmission beams from the set of transmission beams, the proper subset of transmission beams being based on the reference signal information and using precoding weights being based on the reference signal information.

According to a sixth aspect there is presented a computer program for precoding over a beam subset, the computer program comprising computer program code which, when run on processing circuitry of a wireless device, causes the wireless device to perform a method according to the fourth aspect.

According to a seventh aspect there is presented a computer program product comprising a computer program according to at least one of the third aspect and the sixth aspect and a computer readable means on which the computer program is stored. In one embodiment the computer readable means are non-transitory computer readable storage means.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As herein defined, the concept of an antenna element is non-limiting in the sense that it can refer to any virtualization (e.g., linear mapping) of a transmitted signal to the physical antenna elements. For example, groups of physical antenna elements could be fed the same signal, and hence they share the same virtualized antenna port when observed at the receiver. Hence, the receiver cannot distinguish and measure the channel from each physical antenna element within the group of elements that are virtualized together. Thus, the terms "antenna element", "antenna port", "virtual antenna port", or simply "port" could be considered interchangeable in this disclosure.

The embodiments disclosed herein relate to mechanisms for precoding over a beam subset. In order to obtain such mechanisms there is provided a network node, a method performed by the network node, a computer program comprising code, for example in the form of a computer program product, that when run on processing circuitry of the network node, causes the network node to perform the method. In order to obtain such mechanisms there is further provided a wireless device, a method performed by the wireless device, and a computer program comprising code, for example in the form of a computer program product, that when run on processing circuitry of the wireless device, causes the wireless device to perform the method.

Figure 1A:
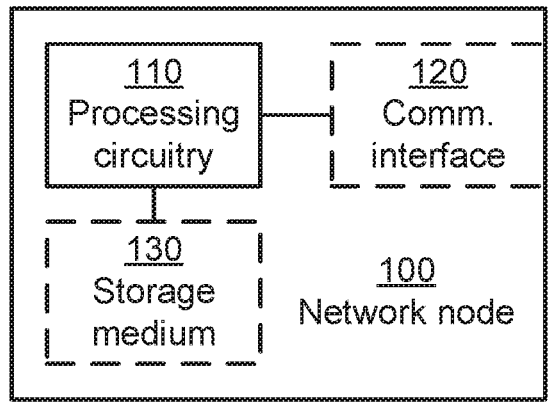
FIG. 1a is a schematic diagram showing functional units of a network node according to an embodiment.

FIG. 1a schematically illustrates, in terms of a number of functional units, the components of a network node 100 according to an embodiment. Processing circuitry 110 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310a (as in FIG. 3), e.g. in the form of a storage medium 130.

Particularly, the processing circuitry 110 is configured to cause the network node 100 to perform a set of operations, or steps, S102-S108. These operations, or steps, S102-S108 will be disclosed below. For example, the storage medium 130 may store the set of operations, and the processing circuitry 110 may be configured to retrieve the set of operations from the storage medium 130 to cause the network node 100 to perform the set of operations. The set of operations may be provided as a set of executable instructions. Thus the processing circuitry 110 is thereby arranged to execute methods as herein disclosed.

Further, the network node 100 may comprise precoder 100a, a beam selector, and a beam-forming network 100c. The precoder 100a, the beam selector, and the beam-forming network 100c may be implemented by the processing circuitry 110. Operations of the precoder 100a, the beam selector, and the beam-forming network 100c will be further disclosed below with reference to FIGS. 12 and 13.

The storage medium 130 may also comprise persistent storage, which, for example, can be any single one or combination of magnetic memory, optical memory, solid state memory or even remotely mounted memory.

The network node 100 may further comprise a communications interface 120 for communications with at least one wireless device 200 as well as other network nodes 100. As such the communications interface 120 may comprise one or more transmitters and receivers, comprising analogue and digital components and a suitable number of antenna ports and antennas for wireless communications and ports for wireline communications.

The processing circuitry 110 controls the general operation of the network node 100 e.g. by sending data and control signals to the communications interface 120 and the storage medium 130, by receiving data and reports from the communications interface 120, and by retrieving data and instructions from the storage medium 130. Other components, as well as the related functionality, of the network node 100 are omitted in order not to obscure the concepts presented herein.

Figure 1B:
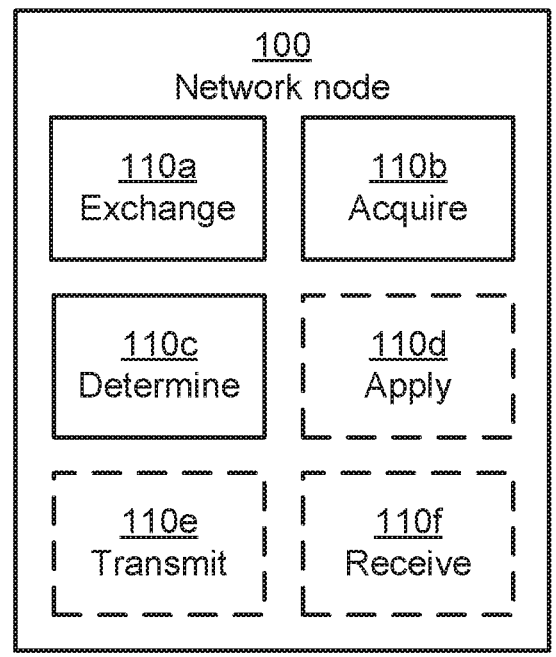
FIG. 1b is a schematic diagram showing functional modules of a network node according to an embodiment.

FIG. 1b schematically illustrates, in terms of a number of functional modules, the components of a network node 100 according to an embodiment. The network node 100 of FIG. 1b comprises a number of functional modules; an exchange module 110a configured to perform below step S102, an acquire module 110b configured to perform below step S104, and a determine module 110c configured to perform below steps S106, S102h, S102k. The network node 100 of FIG. 1b may further comprises a number of optional functional modules, such as any of an apply module 110d configured to perform below step S108, a transmit module 110e configured to perform below steps S102a, S102c, S102e, and a receive module 110f configured to perform below steps S102b, S102d, S102f, S102g, S102j, and S102m. The functionality of each functional module 110a-110f will be further disclosed below in the context of which the functional modules 110a-110f may be used. In general terms, each functional module 110a-110f may in one embodiment be implemented only in hardware or and in another embodiment with the help of software, i.e., the latter embodiment having computer program instructions stored on the storage medium 130 which when run on the processing circuitry 110 makes the network node 100 perform the corresponding steps mentioned above in conjunction with FIG. 1b. It should also be mentioned that even though the modules correspond to parts of a computer program, they do not need to be separate modules therein, but the way in which they are implemented in software is dependent on the programming language used. Preferably, one or more or all functional modules 110a-110f may be implemented by the processing circuitry 110, possibly in cooperation with functional units 120 and/or 130. The processing circuitry 110 may thus be configured to from the storage medium 130 fetch instructions as provided by a functional module 110a-110f and to execute these instructions, thereby performing any steps of the network node 100 as will be disclosed hereinafter.

The network node 100 may be provided as a standalone device or as a part of at least one further device. For example, the network node 100 may be provided in a node of a radio access network, such as in a radio access network node (radio base station, base transceiver station, node B, evolved node B, access point), or in a node of a core network. Alternatively, functionality of the network node 100 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the network node 100 may reside in the radio access network, such as in the radio access network node, for cases when embodiments as disclosed herein are performed in real time.

Figure 2A:
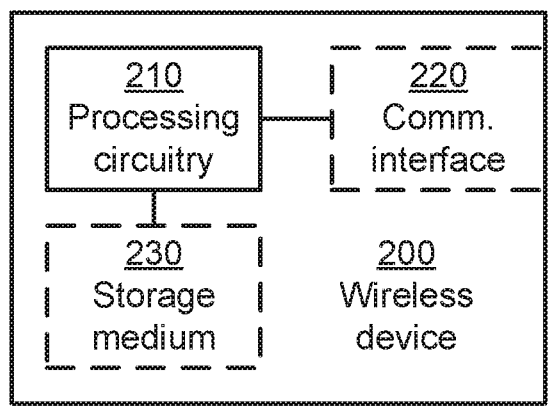
FIG. 2a is a schematic diagram showing functional units of a wireless device according to an embodiment.

Thus, a first portion of the instructions performed by the network node 100 may be executed in a first device, and a second portion of the of the instructions performed by the network node 100 may be executed in a second device; the herein disclosed embodiments are not limited to any particular number of devices on which the instructions performed by the network node 100 may be executed. Hence, the methods according to the herein disclosed embodiments are suitable to be performed by a network node 100 residing in a cloud computational environment. Therefore, although a single processing circuitry 110 is illustrated in FIG. 2a, the processing circuitry 110 may be distributed among a plurality of devices, or nodes. The same applies to the functional modules 110a-110f of FIG. 1b and the computer program 3200a of FIG. 3 (see below).

FIG. 2a schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310b (as in FIG. 3), e.g. in the form of a storage medium 230.

Particularly, the processing circuitry 210 is configured to cause the wireless device 200 to perform a set of operations, or steps, S202-S204. These operations, or steps, S202-S204 will be disclosed below. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with at least one network node 100. As such the communications interface 220 may comprise one or more transmitters and receivers, comprising analogue and digital components and a suitable number of antenna ports and antennas for wireless communications.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 2B:
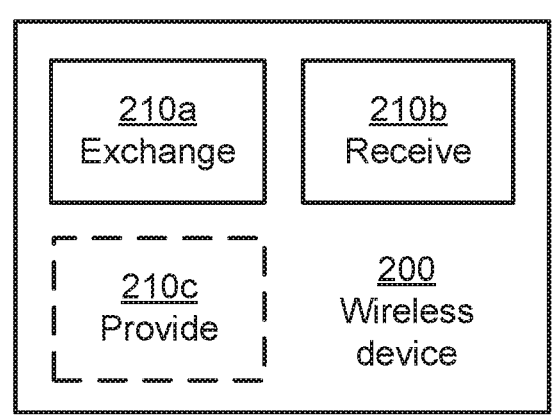
FIG. 2b is a schematic diagram showing functional modules of a wireless device according to an embodiment.

FIG. 2b schematically illustrates, in terms of a number of functional modules, the components of a wireless device 200 according to an embodiment. The wireless device 200 of FIG. 2b comprises a number of functional modules; an exchange module 210a configured to perform below step S202, and a receive module 210b configured to perform below steps S204, S202a, S202c, and S202e. The wireless device 200 of FIG. 2b may further comprises a number of optional functional modules, such as a provide module 210c configured to perform below steps S202b, S202d, S202f, S202g, S202j, S202m. The functionality of each functional module 2100a-210c will be further disclosed below in the context of which the functional modules 2100a-2100c may be used. In general terms, each functional module 2100a-2100c may in one embodiment be implemented only in hardware or and in another embodiment with the help of software, i.e., the latter embodiment having computer program instructions stored on the storage medium 230 which when run on the processing circuitry 210 makes the wireless device 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 2100a-2100c may be implemented by the processing circuitry 210, possibly in cooperation with functional units 220 and/or 230. The processing circuitry 210 may thus be configured to from the storage medium 230 fetch instructions as provided by a functional module 2100a-210c and to execute these instructions, thereby performing any steps of the wireless device 200 as will be disclosed hereinafter.

The wireless device 200 may be embodied as a mobile station, mobile phone, handset, wireless local 100p phone, user equipment (UE), smartphone, laptop computer, tablet computer, wireless modem, or sensor.

Figure 3:
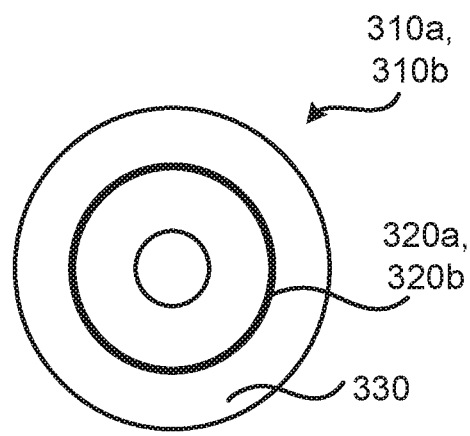
FIG. 3 shows one example of a computer program product comprising computer readable means according to an embodiment.

FIG. 3 shows one example of a computer program product 310a, 310b comprising computer readable means 330. On this computer readable means 330, a computer program 320a can be stored, which computer program 320a can cause the processing circuitry 110 and thereto operatively coupled entities and devices, such as the communications interface 120 and the storage medium 130, to execute methods according to embodiments described herein. The computer program 320a and/or computer program product 3100a may thus provide means for performing any steps of the network node 100 as herein disclosed. On this computer readable means 330, a computer program 320b can be stored, which computer program 320b can cause the processing circuitry 210 and thereto operatively coupled entities and devices, such as the communications interface 220 and the storage medium 230, to execute methods according to embodiments described herein. The computer program 320b and/or computer program product 310b may thus provide means for performing any steps of the wireless device 200 as herein disclosed.

In the example of FIG. 3, the computer program product 3100a, 310b is illustrated as an optical disc, such as a CD (compact disc) or a DVD (digital versatile disc) or a Blu-Ray disc. The computer program product 310a, 310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320a, 320b is here schematically shown as a track on the depicted optical disk, the computer program 320a, 320b can be stored in any way which is suitable for the computer program product 310a, 310b.

Figure 4:
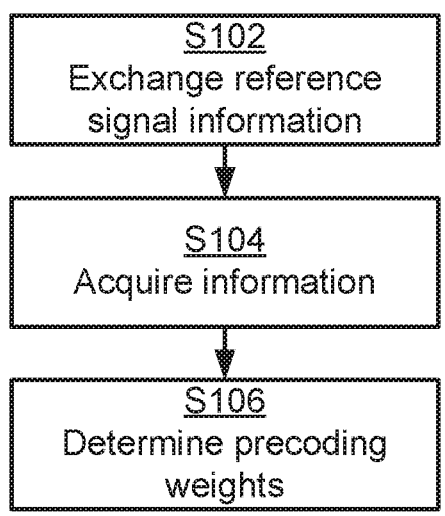
FIGS. 4, 5, 6, and 7 are flowcharts of methods according to embodiments.
Figure 6:
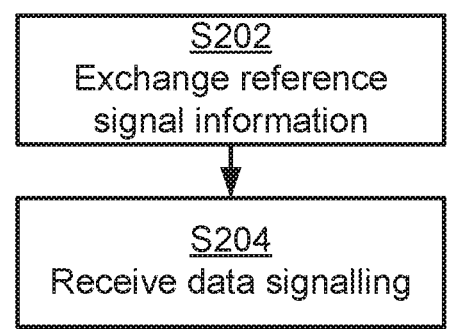
Figure 5:
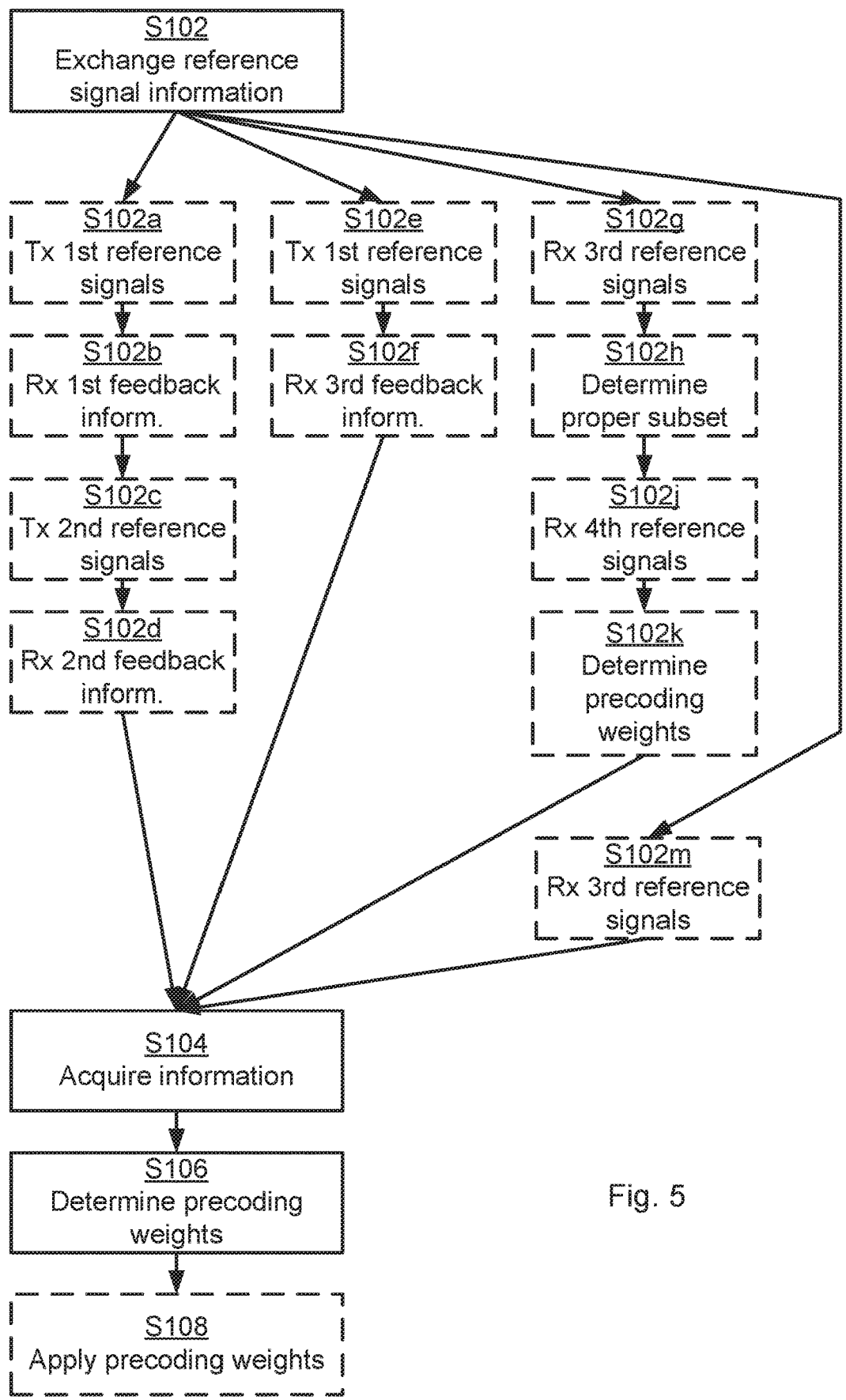
Figure 7:
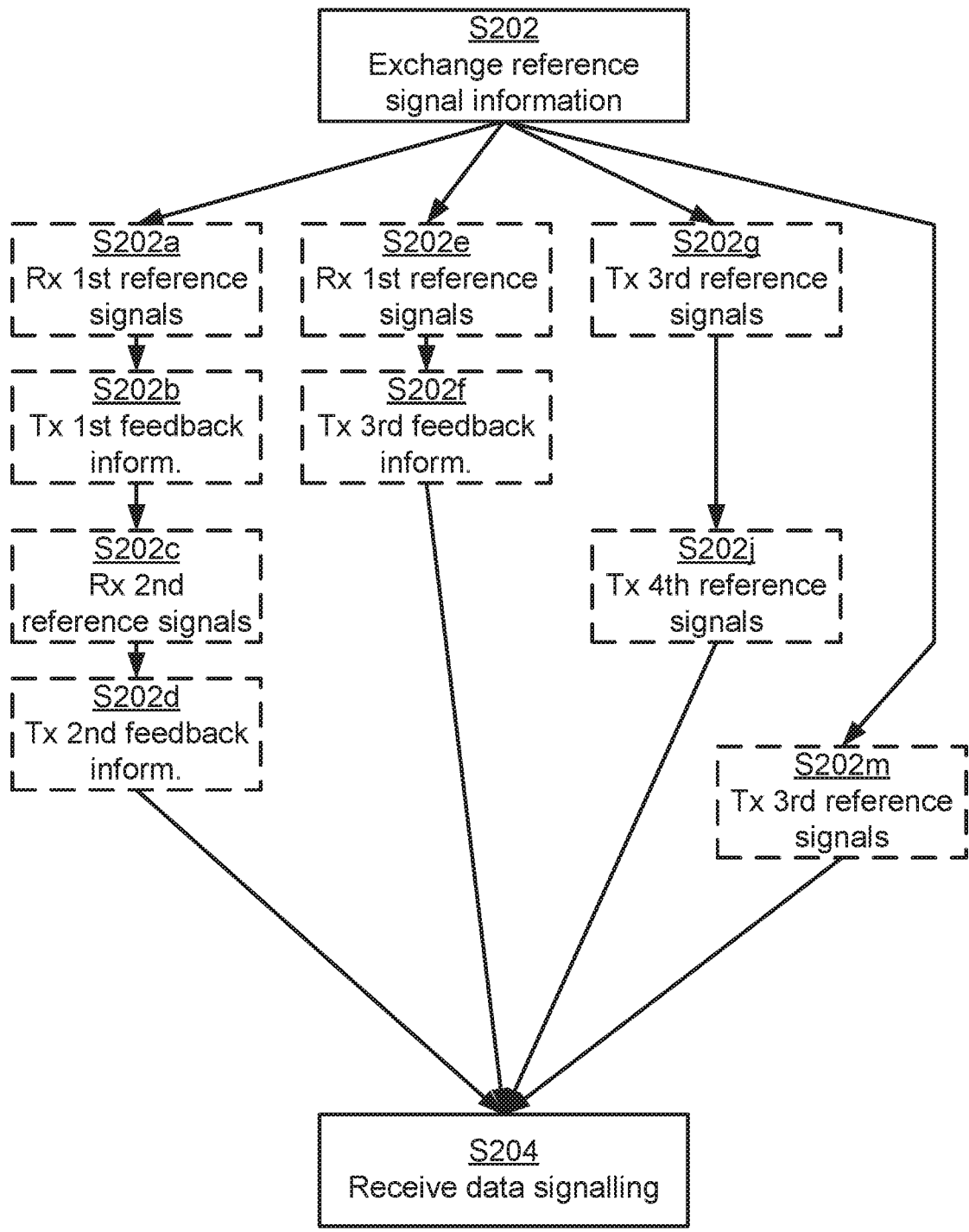

FIGS. 4 and 5 are flow charts illustrating embodiments of methods for precoding over a beam subset as performed by the network node 100. FIGS. 6 and 7 are flow charts illustrating embodiments of methods for precoding over a beam subset as performed by the wireless device 200. The methods are advantageously provided as computer programs 320a, 320b.

Reference is now made to FIG. 4 illustrating a method for precoding over a beam subset as performed by the network node 100 according to an embodiment.

The network node 100 is capable of exchanging reference signal information for a set of transmission beams 1210 and a set of antenna ports. The network node 100 is configured to, in a step S102, exchange reference signal information for the set of transmission beams 1210 or the set of antenna ports with the wireless device 200. In this respect the exchange module 110a may comprise instructions that when executed by the network node 100 causes the processing circuitry 110 to, via the communications interface 120, exchange the reference signal information in order for the network node 100 to perform step S102. Different embodiments regarding how the network node 100 may exchange this reference signal information with the wireless device 200 will be provided below.

The network node 100 is configured to, in a step S104, acquire, based on the reference signal information, information regarding which proper subset of transmission beams 1220 from the set of transmission beams to use for communication with the wireless device 200. In this respect the acquire module 1100b may comprise instructions that when executed by the network node 100 causes the processing circuitry 110 to, possibly together with the communications interface 120 and/or the storage medium 130, acquire this information in order for the network node 100 to perform step S104. Different embodiments regarding how the network node 100 may acquire this information will be provided below.

The network node 100 is configured to, in a step S106, determine precoding weights for the proper subset of transmission beams based on the reference signal information. In this respect the determine module 110c may comprise instructions that when executed by the network node 100 causes the processing circuitry 110 to, possibly together with the communications interface 120 and/or the storage medium 130, determine the precoding weights in order for the network node 100 to perform step S106. Different embodiments regarding how to determine the precoding weights will be provided below.

In this respect, all antenna ports are used also for the proper subset of transmission beams; it is only the number of transmission beams that may be reduced. As will be further disclosed below, the reduction of the number of transmission beams can be accomplished either by exchanging the first set of reference signals over transmission beams or antenna ports, but the number of antenna ports are not reduced.

Further, the proposed precoding over a beam subset enables high beamforming gain in wireless communications channels with high angular spread since several transmission beams are used in the precoding.

Embodiments relating to further details of precoding over a beam subset will now be disclosed.

There may be different types of precoding weights. For example, the precoding weights may be maximum ratio transmission (MRT) weights, matched filter (MF) weights according to Equation (1), zero-forcing (ZF) weights, signal-to-leakage-and-noise ratio (SLNR) weights, or minimum-mean-square-error (MMSE) weights.

There may be different ways to select how many transmission beams to be included in the proper subset of transmission beams. For example, the number of beams in the subsets may be determined adaptively based on signal quality reports as defined by the feedback information from the wireless device 200. That is, the number of transmission beams in the proper subset of transmission beams may be determined adaptively based on the exchanged reference signal information. An adaptive selection of the number of beams in the subsets could for example be to select all beams in the subsets which have an RSRP or CQI which is higher than x dB below the best beams in the subsets, where x is a design parameter.

For example, the number of beams in the subsets may be determined according to an a priori decision. That is, the number of transmission beams in the proper subset of transmission beams may be determined based on amount of available radio resources, amount of available baseband resources, angular spread (such as the angular spread in the particular propagation environment the network node 100 has been deployed in), or any combination thereof.

For example, the number of beams in the subsets may be determined according to system parameters. In an OFDM system, the beams selection can be frequency-selective or wideband. For example, this means that the best beams in the subsets can be selected per subcarrier, per resource block or based on which beams are best over the entire bandwidth in some average sense. That is, the number of transmission beams in the proper subset of transmission beams may be determined per subcarrier, or per resource block, and per wireless device. Further, the number of beams in the proper subset of beams can be different for different wireless devices.

Reference is now made to FIG. 5 illustrating methods for precoding over a beam subset as performed by the network node 100 according to further embodiments.

There may be different ways for the network node 100 to act once the precoding weights for the proper subset of transmission beams have been determined, as in step S106. According to one embodiment the precoding weights are applied to data transmission. The precoding weights are applied on the selected proper subset of beams for the data transmission. Hence, according to this embodiment the network node 100 is configured to, in a step S108, apply the precoding weights to the proper subset of transmission beams during data transmission to the wireless device 200. For example, the transmission beams may in the proper subset of transmission beams be combined using MRT weights or MF weights. How to determine MRT weights and MF weights has been disclosed above.

Further embodiments of methods for precoding over a beam subset as performed by the network node 100 will be disclosed below.

Reference is now made to FIG. 6 illustrating a method for precoding over a beam subset as performed by the wireless device 200 according to an embodiment.

The wireless device 200 is configured to, in a step S202, exchange reference signal information for a set of transmission beams 1210 or set of antenna ports with the network node 100. As noted above, the network node 100 is capable of exchanging reference signal information for the set of transmission beams 1210 and the set of antenna ports. Different embodiments regarding how the wireless device 200 may exchange this reference signal information with the network node 100 will be provided below. In this respect the exchange module 210a may comprise instructions that when executed by the wireless device 200 causes the processing circuitry 210 to, via the communications interface 220, exchange this reference signal information in order for the wireless device 200 to perform step S202.

The determined precoding weights for the proper subset of transmission beams may by the network node 100 be used for data transmission to the wireless device 200. The wireless device 200 is therefore further configured to, in a step S204, receive data transmission from the network node 100 in the proper subset of transmission beams 1220 from the set of transmission beams, where the proper subset of transmission beams is based on the reference signal information, and where precoding weights being based on the reference signal information are used during the data transmission. In this respect the receive module 210b may comprise instructions that when executed by the wireless device 200 causes the insert processing circuitry 210 to, via the communications interface 220, receive the data transmission from the network node 100 in order for the wireless device 200 to perform step S204.

Embodiments relating to further details of precoding over a beam subset relevant for both the network node 100 and the wireless device 200 will now be disclosed.

Assuming the wireless device 200 has a single antenna, the complex channel vector in beam-space for N transmission beams is given by $$h_{BS} = hW$$

where $h_{BS}$ is the 1-by-N channel vector in beam-space, W is an M-by-N beamforming matrix, and h is the 1-by-M channel vector in antenna element-space. The beamforming matrix can for example be a DFT matrix. One purpose of a first reference signal transmission (i.e., transmission of a first set of reference signals) may be to obtain an estimate of the channel vector for each transmission beam, i.e., to obtain an estimate of $|(h_{BS})_n|^2$, n=1, ..., N, in order for the network node 100 to be able to, as in step S102, select the transmission beams in the proper subset of transmission beams as the transmission beams with highest channel power. Further, one purpose of a second reference signal transmission (i.e., transmission of a second set of reference signals) may be to obtain an estimate of the complex channel $(h_{BS})_n$, $n \in \mathbb{N}$, where $\mathbb{N}$ is the proper subset of the $N_s$ selected transmission beams (i.e., the transmission beams in the beam subset). This is achieved by transmitting a reference signal in each selected transmission beam, as is done for the second set of reference signals. This estimate can then be used to determine a beam-space precoding vector, e.g., an MRT precoder according to $$w_{BS} = \frac{\tilde{h}_{BS}^H}{\|\tilde{h}_{BS}^H\|}$$

where $w_{BS}$ is the $N_s$-by-1 beam-space precoding vector, $\tilde{h}_{BS}$ is the estimated 1-by-$N_s$ the beam-space channel vector for the selected beam subset, and $\|\tilde{h}_{BS}^H\|$ denotes the Frobenius norm of $\tilde{h}_{BS}$. Finally, in the precoded data transmission, the received symbol at the wireless device 200 is given by $$y = hW_{Ns}w_{BS}s$$

where $W_{Ns}$ is an M-by-$N_s$ matrix obtained by picking the $N_s$ columns of W that correspond to the selected beam subset and s is the transmitted symbol.

As noted above, one reference signal may be transmitted on each antenna port in the first reference signal transmission. By specifying the beamforming matrix W as a codebook known to the wireless device 200, the wireless device 200 can deduce the signal quality for each transmission beam and report this to the network node (for all transmission beams or the proper subset of transmission beams).

The beam-space precoding vector may be determined from a pre-defined codebook known to the wireless device 200. The reference signals transmitted in the second reference signal transmission may then be weighted by the corresponding beam quality estimated from the first reference signal transmission, e.g. $|h_{BS}|_n$, $n \in \mathbb{N}$ where $\mathbb{N}$ is the set of $N_s$ selected beams in the beam subset. One purpose of this is to put more weight on high-quality beams. In the precoded data transmission, the received symbol at the wireless device 200 is in this case given by $$y = chW_{Ns}Aw_{CB}s$$

where A is an $N_s$-by-$N_s$ diagonal weighting matrix that is used to emphasize transmission beams with higher signal quality and c is a scalar normalization determined from the available power amplifier resources. Furthermore, $w_{CB}$ denotes the $N_s$-by-1 beam-space precoding vector that is selected from the codebook, based on a precoding matrix indicator (PMI) report received from the wireless device 200. The diagonal elements in A could for example be given by $|h_{BS}|_n$, $n \in \mathbb{N}$.

Alternatively, the selection of transmission beams in the proper subset of transmission beams can be based on uplink measurements, such as in the third and fourth embodiments below, e.g., by means of sounding reference signals (SRS). From such measurements, transmission beams can for example be selected based on the network node 100 measuring signal quality in different reception beams of the network node 100 (i.e., beams in which signalling is received from the wireless device 200) by means of the wireless device 200 transmitting reference signals during the exchange of reference signal information in steps S102 and S202 and the network node 100 measures received signal quality in different reception beams. Another option is to calculate an uplink covariance matrix from which dominant clusters in the channel can be estimated. The proper subset of transmission beams could then be selected to cover these dominant clusters.

For time division duplex (TDD) systems, also estimation of the complex beam-space channel $(h_{BS})_n$, $n \in \mathbb{N}$, could be based on uplink reference signals, such as in the third embodiment, if the system is properly calibrated so that reciprocity between uplink and downlink holds.

Four embodiments for exchanging reference signal information for a set of transmission beams or antenna ports between a network node and a wireless device 200 as in steps S102 and S202, will now be disclosed.

Figure 8:
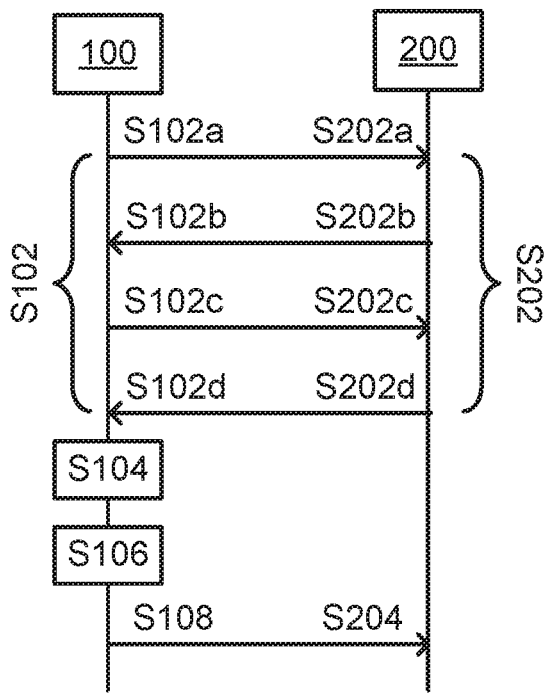
FIGS. 8, 9, 10, and 11 are signalling diagrams of methods according to embodiments.

A first embodiment for exchanging reference signal information will now be disclosed in detail with reference to the signalling diagram of FIG. 8. Parallel references are made to the flowcharts of FIG. 5 and FIG. 7. This embodiment is based on the network node 100 transmitting two occurrences of reference signals (denoted a first set of reference signals, and a second set of reference signals, respectively) during the exchange of reference signals in step S102, and where the wireless device 200 responds to the reference signals by providing feedback (denoted first feedback information, and second feedback information, respectively) to the network node 100 during the exchange of reference signals in step S202.

Particularly, according to this first embodiment the network node 100 is configured to, in a step S102a, transmit a first set of reference signals in the set of transmission beams or antenna ports.

There may be different ways for the network node 100 to transmit the first set of reference signals in the set of transmission beams. For example, the transmission beams may in the set of transmission beams be transmitted in DFT GoBs. How to form DFT GoBs has been disclosed above. One reference signal may be used per DFT beam in the GoB. Each of these reference signals may be beam-formed by the corresponding DFT vector, making the data and reference signal equivalent from a beamforming perspective. The DFT GoB may be known by the wireless device 200 in the form of a codebook, and the wireless device 200 will hence be able to evaluate different beams within the codebook, given the channel estimates made by the wireless device 200 for the received first set of reference signals.

The GoB does not need to consist of DFT transmission beams. One characteristics of the transmission beams used for transmitting the first set of reference signals is that they should have a well-defined main beam pointing in a specified direction and a sufficiently low sidelobe level. For example, the transmission beams could have been synthesized using some tapering. The beam pointing directions do not need to be regularly spaced in $\sin(\phi)$ space, but could be regularly spaced in, e.g., $\phi$-space, or irregularly spaced. The angular span of the GoB should cover the desired angular coverage of the sector of the cell in which the network node 100 provides network access.

Further, there may be different ways for the network node 100 to transmit the first set of reference signals on the antenna ports. For example, one reference signal of the first set of reference signals may be transmitted on each antenna port of the network node 100.

Further, the first set of reference signals may be transmitted relatively sparse in time and frequency, since they will not be used for precoding, coherent demodulation or link adaptation, but only for beam or port selection.

This first set of reference signals is assumed to be received by the wireless device 200. Hence, according to this first embodiment the wireless device 200 is configured to, in a step S202a receive the first set of reference signals in the set of transmission beams or antenna ports.

The wireless device 200 responds to the received first set of reference signals by providing feedback to the network node 100. Particularly, the wireless device 200 is configured to, in a step S202b, provide first feedback information of the first set of reference signals to the network node 100. The first feedback information defines a first part of the reference signal information exchanged in steps S102 and S202.

There are different examples of first feedback information that can be provided by the wireless device 200. The first feedback information can, for example, comprise signal quality estimates such as reference signal received power (RSRP) values and/or channel quality indicator (CQI) values. The skilled person will understand how RSRP values and CQI values can be determined by the wireless device 200 from performing suitable measurements on the first reference signals and how the RSRP values and CQI values can be provided to, and interpreted by, the network node 100.

The wireless device 200 may report first feedback information for a number of transmission beams. It could be for all transmission beams or antenna ports, only for the best transmission beam (the one with highest signal quality), or for a few of the best transmission beams. The first feedback information could thus be provided for all transmission beams in the set of transmission beams or all antenna ports in the set of antenna ports or only for a proper subset of such transmission beams. For example, respective RSRP values and/or CQI values could be provided for each transmission beam in the set of transmission beams or each antenna port in the set of antenna ports or only for a proper subset of such transmission beams. When the first set of reference signal is transmitted over antenna ports, the wireless device 200 does not report signal quality for the antenna ports. It reports an index in a codebook (such as a PMI report).

This first feedback information is assumed to be received by the network node 100. Hence, the network node 100 is configured to, in a step S102b, receive the first feedback information of the first set of reference signals from the wireless device 200. The first feedback information defines a first part of the reference signal information. The proper subset of transmission beams is then by the network node 100 determined from this first part of the reference signal information.

As noted above, the first embodiment is based on the network node 100 transmitting two occurrences of reference signals. Therefore, according to this first embodiment the network node 100 is configured to, in a step S102c, transmit a second set of reference signals in the proper subset of transmission beams. The second set of reference signals using the selected proper subset of transmission beams is transmitted for the network node 100 to obtain more accurate channel information, such as CSI, for these beams.

There may be different ways for the network node 100 to transmit the second set of reference signals in the proper subset of transmission beams. Further, the second set of reference signals may be weighted according to the first feedback information. The second set of reference signals may be weighted according to the first feedback information only when the first set of reference signals is transmitted on the antenna ports of the network node 100.

This second set of reference signals is assumed to be received by the wireless device 200. Hence, according to this first embodiment the wireless device 200 is configured to, in a step S202c, receive the second set of reference signals in the proper subset of transmission beams.

In comparison to the first set of reference signals, the second set of reference signals are transmitted (by the network node 100) and received (by the wireless device 200) more densely in time and/or frequency than the first set of reference signals since the second set of reference signals will be used for determining the precoding weights.

The wireless device 200 responds to the received second set of reference signals by providing feedback to the network node 100. Particularly, the wireless device 200 is configured to, in a step S202d, provide second feedback information of the second set of reference signals to the network node 100. The second feedback information defines a second part of the reference signal information exchanged in steps S102 and S202.

To be precise, this feedback information is denoted second feedback information to distinguish this feedback information from the first feedback information; the second feedback information is only valid for the received second set of reference signals. In relation to the first feedback information, the second feedback information may comprise more complete information about the transmission channel on which the reference signals are transmitted. For example, the second feedback information may comprise amplitude values, phase values, and/or phase difference values relating to the received second set of reference signals so as to provide more complete information for the transmission channel covered by the received second set of reference signals. Thus, the wireless device 200 may be configured to estimate and report amplitude and phase (or phase differences) of channel coefficients based on the received second set of reference signals.

Further, the first feedback information and/or the second feedback information may comprise a precoding matrix indicator (PMI) based on the received first and/or second set of reference signals and a codebook known to the network node 100 and wireless device 200.

This second feedback information may be provided for all transmission beams in the proper subset of transmission beams, or only for a proper subset of such transmission beams (i.e., for a proper subset of a proper subset of all the transmission beams).

This second feedback information is assumed to be received by the network node 100. Hence, the network node 100 is configured to, in a step S102b, receive the second feedback information of the second set of reference signals from the wireless device 200. The network node 100 then determines the precoding weights based on the reports from the wireless device 200 as comprised in the second feedback information. The precoding weights are by the network node 100 determined from this second part of the reference signal information.

This enables a combination of DFT beamforming and MRT beamforming to be used in order to achieve benefits of both these mechanisms but without being hampered by their respective problems. MRT beamforming can be applied to the best transmission beams (i.e., the proper subset of transmission beams 1220 from the set of transmission beams) in a DFT GoB. Since real-world NLoS channels typically comprises a few dominating clusters, only information related to this proper subset of beams in a DFT GoB is needed to provide sufficient feedback for the MRT. Therefore, the wireless device 200 may be configured to report CSI relating to only a few beams instead of reporting the full channel knowledge.

Compared to MRT using full channel knowledge, the proposed precoding over a beam subset according to at least this first embodiment can be implemented with much lower feedback overhead since the first reference signals transmitted and received in steps S102a and S102b (and the feedback information provided and received in steps S202b and S102b) can be sparse in time and frequency (compared to the second reference signals) and the second reference signals transmitted and received in steps S102c and S102c (and the feedback information provided and received in steps S202d and S102d) that can be used for detailed CSI acquisition may only be transmitted in a few transmission beams (or on a few antenna ports), much fewer than the number of antenna elements used for the first reference signals.

Hence, in this embodiment step S102 comprises steps S102a, S102b, S102c, and S102d; and step S202 comprises steps S202a, S202b, S202c, and S202d.

Figure 9:
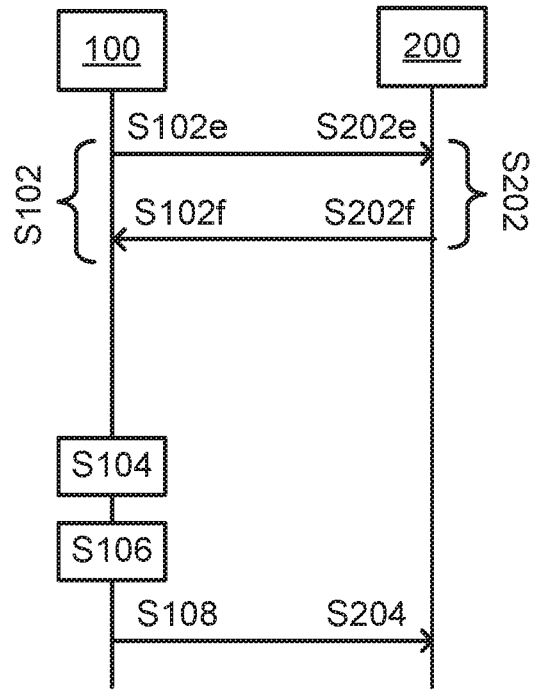

A second embodiment for exchanging reference signal information will now be disclosed in detail with reference to the signalling diagram of FIG. 9.

Parallel references are made to the flowcharts of FIG. 5 and FIG. 7. This embodiment is based on the network node 100 transmitting one occurrence of reference signals (denoted a first set of reference signals) during the exchange of reference signals in step S102, and where the wireless device 200 responds to the reference signals by providing feedback (denoted third feedback information) to the network node 100 during the exchange of reference signals in step S202.

Particularly, according to this second embodiment the network node 100 is configured to, in a step S102e, transmit a first set of reference signals in the set of transmission beams or antenna ports. This step is similar to step S102a as disclosed above and properties and features as disclosed with reference to step S102a apply also to step S102e.

Hence, it is assumed that the first set of reference signals is received by the wireless device 200. Thus, the wireless device 200 is configured to, in a step S202e, receive the first set of reference signals in the set of transmission beams or antenna ports.

However, in contrast to the first embodiment, only one occurrence of feedback information, hereinafter denoted third feedback information, is provided by the wireless device 200. Particularly, the wireless device 200 is configured to, in a step S202f, provide third feedback information of the first set of reference signals to the network node 100.

To be precise, this feedback information is denoted third feedback information to distinguish this feedback information from the first feedback information and the second feedback information; the third feedback information is similar to the second feedback information but based on the first set of reference signals instead of the second set of reference signals (as the second feedback information). For example, the third feedback information may comprise amplitude values, phase values, and/or phase difference values (based on the received first set of reference signals). Further, the third feedback information may comprise a PMI based on the received first set of reference signals and a codebook known to the network node 100 and wireless device 200.

This third feedback information is assumed to be received by the network node 100. Hence, the network node 100 is configured to, in a step S102f, receive the third feedback information of the first set of reference signals from the wireless device 200. This third feedback information defines the reference signal information.

Hence, in this embodiment step S102 comprises steps S102e, and S102f; and step S202 comprises steps S202e, and S202f.

According to a third embodiment and a fourth embodiment the number of beams in the proper subset of beams is determined based on uplink measurements.

Figure 10:
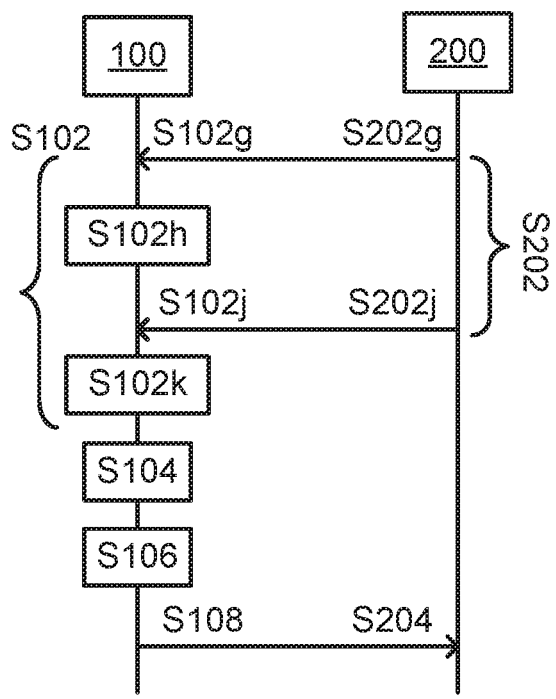

A third embodiment for exchanging reference signal information will now be disclosed in detail with reference to the signalling diagram of FIG. 10. Parallel references are made to the flowcharts of FIG. 5 and FIG. 7. This embodiment is based on the wireless device 200 providing two occurrences of reference signals (denoted a third set of reference signals, and a fourth set of reference signals, respectively) during the exchange of reference signals in step S202, and where the network node 100 determines the proper subset of transmission beams and the precoding weights from these reference signals during the exchange of reference signals in step S102.

Particularly, according to this second embodiment the wireless device 200 is configured to, in a step S202g, provide a third set of reference signals in the set of transmission beams or antenna ports. This third set of reference signals defines a third part of the reference signal information.

The third set of reference signals may be regarded as serving the same purpose as the first set of reference signals. But to be precise, this set of reference signals is denoted third set of reference signals to distinguish this set of reference signals that is transmitted by the wireless device 200 from the first set of reference signals that is transmitted by the network node 100.

This third set of reference signals is assumed to be received by the network node 100. Hence, according to this third embodiment the network node 100 is configured to, in a step S102g, receive the third set of reference signals in the set of transmission beams or antenna ports. As noted above, this third set of reference signals defines a third part of the reference signal information. The network node 100 is further configured to, in a step S102h, determine the proper subset of transmission beams from this third part of the reference signal information.

As noted above, the third embodiment is based on the wireless device 200 providing two occurrences of reference signals. Therefore, according to this third embodiment the wireless device 200 is configured to, in a step S202j, provide a fourth set of reference signals in the proper subset of transmission beams. The fourth set of reference signals defines a fourth part of the reference signal information.

The fourth set of reference signals may be regarded as serving the same purpose as the second set of reference signals. But to be precise, this set of reference signals is denoted fourth set of reference signals to distinguish this set of reference signals that is transmitted by the wireless device 200 from the third set of reference signals that is transmitted by the network node 100.

There may be different types of reference signals transmitted by the wireless device 200. For example, the third set of reference signals and/or the fourth set of reference signals may comprise SRS. The skilled person will understand how SRS can be transmitted by the wireless device 200 and how the SRS can be received by, and interpreted by, the network node 100.

The fourth set of reference signals is assumed to be received by the network node 100. Hence, the network node 100 is configured to, in a step S102j, receive the fourth set of reference signals in the proper subset of transmission beams. As noted above, the fourth set of reference signals defines a fourth part of the reference signal information. The network node 100 is further configured to, in a step S102k, determine the precoding weights from this fourth part of the reference signal information.

Hence, in this embodiment step S102 comprises steps S102g, S102h, S102j, and S102k; and step S202 comprises steps S202g, and S202j.

Figure 11:
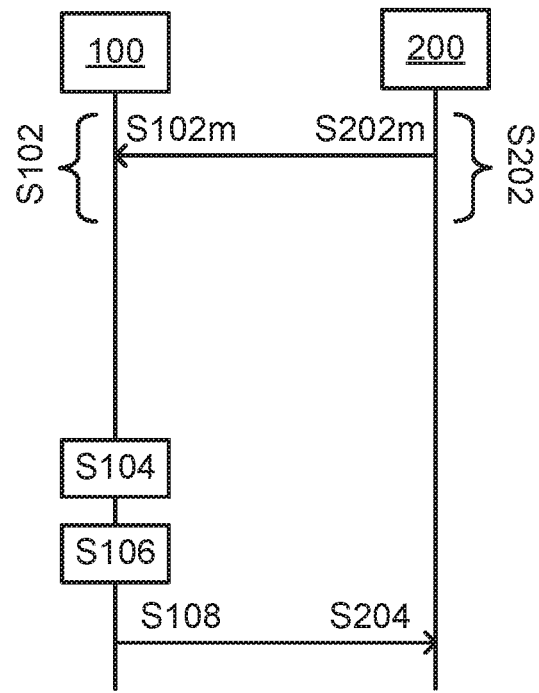

A fourth embodiment for exchanging reference signal information will now be disclosed in detail with reference to the signalling diagram of FIG. 11. Parallel references are made to the flowcharts of FIG. 5 and FIG. 7. This embodiment is based on the wireless device 100 providing one occurrence of reference signals (denoted a third set of reference signals) during the exchange of reference signals in step S202, and where the network node 100 determines the proper subset of transmission beams and the precoding weights from these reference signals during the exchange of reference signals in step S102.

Particularly, according to this fourth embodiment the wireless device 200 is configured to, in a step S202m, provide a third set of reference signals in the set of transmission beams or antenna ports. This third set of reference signals defines the reference signal information. There may be different types of reference signals transmitted by the wireless device 200. For example, the third set of reference signals may comprise SRS.

The third set of reference signals is assumed to be received by the network node 100. Hence, the network node 100 is configured to, in a step S102m, receive the third set of reference signals in the set of transmission beams or antenna ports. As noted above, the third set of reference signals defines the reference signal information and the network node 100 is hence configured to determine the precoding weights for a proper subset of transmission beams from the received third set of reference signals, as in step S106.

Hence, in this embodiment step S102 comprises step S102m; and step S202 comprises step S202m.

Figure 12:
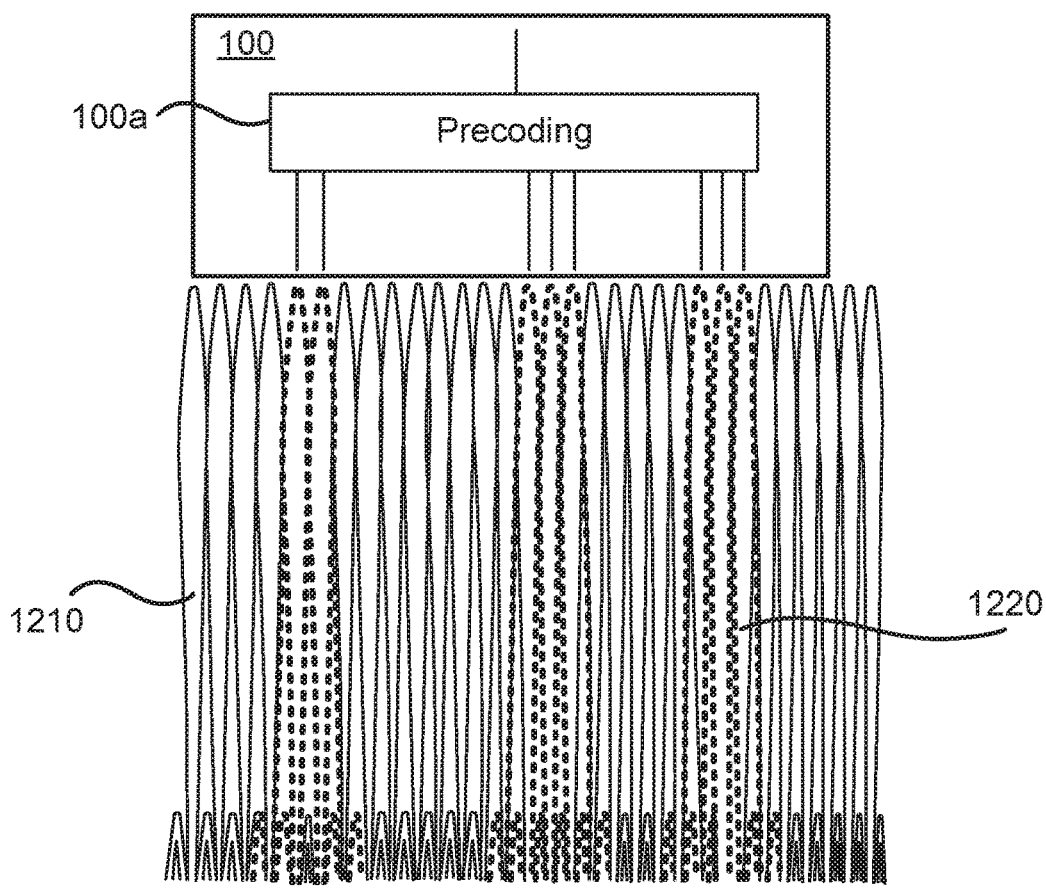
FIG. 12 is a schematic illustration of a network node according to an embodiment.

A schematic illustration of a network node 100 comprising a precoder 100a is shown in FIG. 12. According to the illustration of FIG. 12 the GoB consists of a large number of transmission beams 1210. Based on feedback information received from the wireless device 100 a reduced number of transmission beams 1220, in this case 8, are selected to be used in the precoding.

Figure 13:
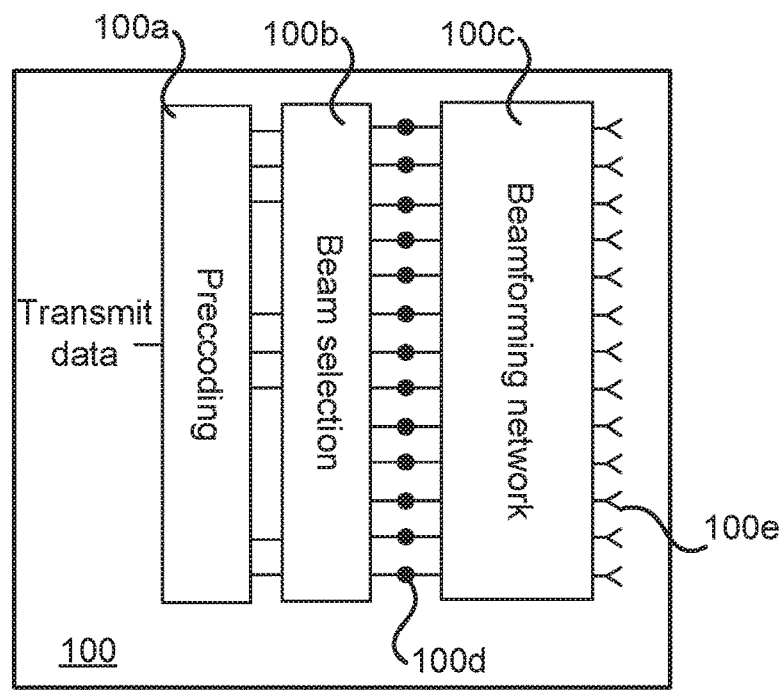
FIG. 13 is a schematic illustration of a network node according to an embodiment.

A schematic illustration of a network node 100 comprising a precoder 100a, a beam selector 100b, and a beam-forming network 100c is shown in FIG. 13. Antenna elements are connected to the beam-forming network 100c that produces a number of beam ports, each beam port corresponding to a transmission beam in the GoB. The beam-forming network 100c can be implemented by digital beam-forming using, e.g., an FFT or by analog beamforming using, e.g., a Butler matrix. If the number of beam ports is equal to the number of antenna elements no information is lost in the beamforming since the FFT is a one-to-one mapping. The beam selection 100b is configured to select a few of the best transmission beams to be used in the precoding 100a. This inevitably leads to loss in information, but if the transmission channel can be represented by a few dominant clusters this loss will be small. This is true for many practical channels.

The herein disclosed network node 100 has some implementation advantages compared to a network node implementing a full-dimension digital system. With MRT precoding on all antenna elements, a baseband and radio branch is needed for each antenna element. With the proposed network node 100 using digital beamforming in the GoB creation, only a few baseband branches are needed in the precoding. This does not reduce the number of radio branches.

However also the number of radio branches can be reduced in the network node 100. If the GoB network is performed by analog beamforming only one radio branch per beam in the selected proper subset of transmission beams is necessary. Since the number of transmission beams in the selected proper subset is lower than the number of antenna elements, the number of radio branches can be reduced significantly. If the number of radio branches is less than the number of transmission beams in the GoB, the CSI used for the transmission beam selection cannot be obtained simultaneously for all transmission beams. However, by switching the available radio branches to the different beams in the GoB sequentially in time, CSI can be obtained for all transmission beams. The beam selection is thereby not frequency-selective. However, the precoding can still be frequency-selective since the precoding is performed in the digital domain.

Figure 14:
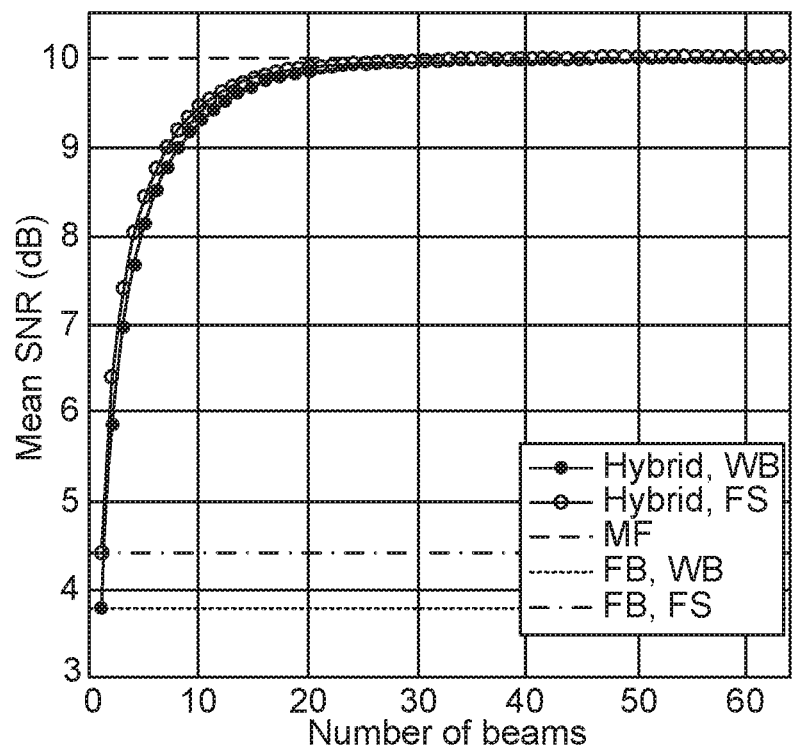
FIGS. 14 and 15 show simulation results according to embodiments.

FIG. 14 shows simulations results. The simulation results represent an ULA with 64 antenna elements and a DFT GoB with 64 transmission beams using the third generation partnership project (3GPP) spatial channel model (SCM) with 20 MHz system bandwidth. The plot shows downlink signal-to-noise ratio (SNR) at the wireless device 200 as a function of the number of transmission beams in the selected proper subset of transmission beams. The SNR has been averaged over a large number of channel realizations. The simulation results are valid for a single wireless device 200 in a single cell and hence there is no interference. Furthermore, perfect channel estimation has been assumed. The Tx power has been set so that the wireless device 200 has an SNR of 10 dB with full beamforming gain.

The dashed line at 10 dB SNR shows the SNR of the MF precoder. This precoder gives full beamforming gain as expected, but puts very high requirements on feedback and hardware implementations. The FB, WB and FB, FS dashed lines show the SNR for a fixed-beam (FB) system where only the best beam has been selected for data transmission according to embodiments for precoding over a beam subset as presented herein. WB and FS refer to wideband and frequency-selective beam selection, respectively. The FB alternative enables the simplest implementation but due to the angular spread of the channel there is about 6 dB loss in SNR. The performance of the herein proposed embodiments is shown in the curves denoted "Hybrid", where, again, WB and FS refers to wideband and frequency-selective beam selection, respectively. As expected, when there is only one beam in the selected proper subset of transmission beams the results of the herein proposed embodiments coincides with the FB approach, and when all 64 beams are used, the herein proposed embodiments have the same performance as MF. One benefit of the herein disclosed embodiments is that the performance is close to MF with only a few transmission beams in the selected proper subset of transmission beams. For example, using 7 out of 64 transmission beams yields only a 1 dB SNR loss compared to the MF precoder using all 64 antenna elements. With the proposed embodiments, this can be achieved with a large reduction in feedback overhead, computational, and hardware complexity compared to the full-dimensional MF alternative. Compared to FB, the herein proposed embodiments yield around 5 dB higher SNR with a moderate increase in feedback overhead, computational, and hardware complexity. For channels with larger angular spread and/or using larger antenna arrays the performance difference will be even larger.

Figure 15:
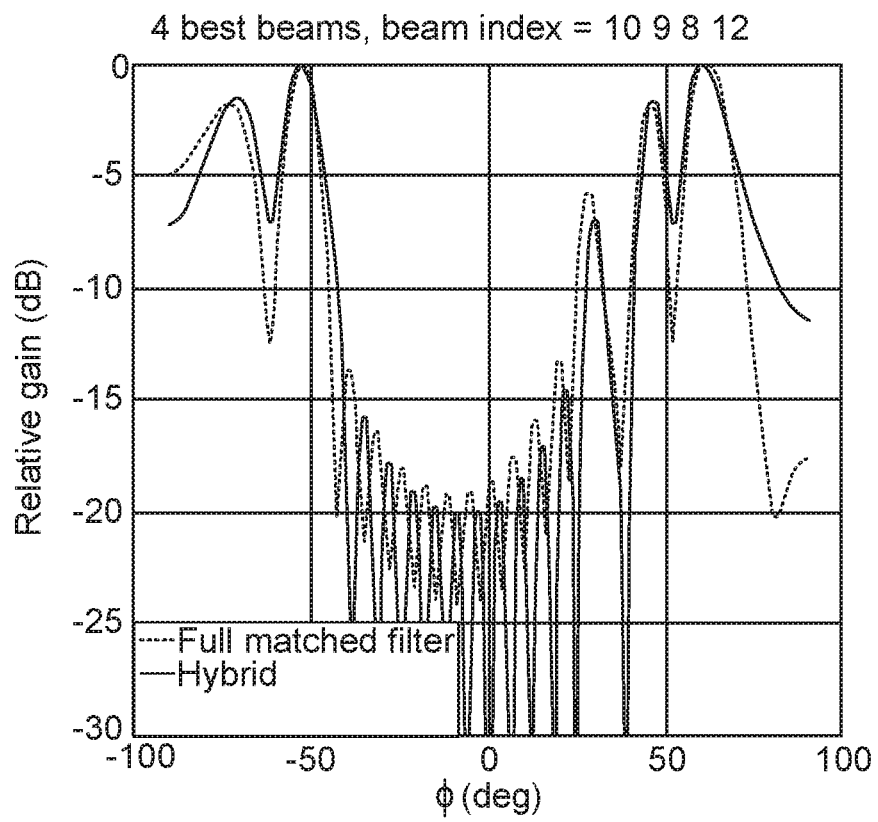

FIG. 15 shows the angular spectra for MF and the proposed herein proposed embodiments, determined as $$P(\phi)=|a^H(\phi)w|^2$$

where a($\phi$) is the array steering vector and w is the precoding vector. The angular spectra have been obtained for one particular channel realization of the 3GPP SCM channel model using a 64-element ULA. The full MF spectrum represents the "true" angular spectrum in the sense that all antenna elements have been used in the calculation. The spectrum for the proposed herein proposed embodiments, in the plot referred to as "hybrid", has been calculated using an MF precoding vector on 4 out of 64 transmission beams in a DFT GoB. The plot shows that the angular spectrum can accurately be represented by 4 beams in this case. This is due to that there are four dominant clusters in this channel realization.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, the proposed precoding over a beam subset can also be generalized to other GoBs than on a DFT grid and other precoders than MRT.

The invention claimed is:

1. A method for precoding over a beam subset, the method being performed by a network node, the method comprising:
   performing one of the following two steps:
   (i) transmitting toward a wireless device a first set of reference signals using a set of transmission beams and after transmitting the first set of reference signals, receiving first feedback information of the first set of reference signals received at the wireless device, wherein the first feedback information was transmitted from the wireless device, and
   (ii) receiving a second set of reference signals using the set of transmission beams, wherein the second set of reference signals was transmitted from the wireless device;
   based on the received first feedback information or the received second set of reference signals, selecting a subset of transmission beams from said set of transmission beams to be used for communication with said wireless device; and
   determining precoding weights for at least a portion of said selected subset of transmission beams based on the received first feedback information or the received second set of reference signals.

2. The method according to claim 1, further comprising:
   applying said precoding weights to said selected subset of transmission beams during data transmission to said wireless device.

3. The method according to claim 1, the method comprising:
   transmitting toward the wireless device the first set of reference signals using the set of transmission beams and after transmitting the first set of reference signals, receiving the first feedback information of the first set of reference signals received at the wireless device, wherein the first feedback information was transmitted from the wireless device.

4. The method according to claim 3, wherein the method further comprises:
   transmitting toward the wireless device a third set of reference signals using the selected subset of transmission beams; and
   after transmitting the third set of reference signals, receiving second feedback information of said third set of reference signals received at said wireless device,
   wherein said precoding weights are determined based on said second feedback information.

5. The method according to claim 4, wherein said third set of reference signals is transmitted more densely in time and/or frequency than said first set of reference signals.

6. The method according to claim 4, wherein said second feedback information comprises amplitude values, phase values, and/or phase difference values.

7. The method according to claim 4, wherein said third set of reference signals is weighted according to said first feedback information.

8. The method according to claim 4, wherein any of said first feedback information and said second feedback information comprises a precoding matrix indicator (PMI) which is based on the received first and/or third set of reference signals and a codebook known to the network node.

9. The method according to claim 3, wherein said first feedback information comprises reference signal received power (RSRP) values and/or channel quality indicator (CQI) values.

10. The method according to claim 3, wherein one reference signal of said first set of reference signals is transmitted over each antenna port of the network node.

11. The method according to claim 1, wherein transmission beams in said set of transmission beams are Discrete Fourier Transform Grid-of-Beams.

12. The method according to claim 1, wherein transmission beams in said selected subset of transmission beams are combined using maximum ratio transmission weights or matched filter weights.

13. The method according to claim 1, the method comprising:
receiving the second set of reference signals using the set of transmission beams, wherein the second set of reference signals was transmitted from the wireless device; and
based on the received second set of reference signals, selecting said subset of transmission beams from said set of transmission beams.

14. The method according to claim 13, the method further comprising:
receiving a third set of reference signals in said selected subset of transmission beams; and
determining said precoding weights based on the third set of reference signals.

15. The method according to claim 13, wherein said second set of reference signals comprises sounding reference signals (SRS).

16. The method according to claim 1, wherein said precoding weights are maximum ratio transmission weights, matched filter weights, zero-forcing weights, signal-to-leakage-and-noise ratio weights, or minimum-mean-square-error weights.

17. The method according to claim 1, wherein number of transmission beams in said selected subset of transmission beams is determined adaptively based on the received first feedback information or the received second set of reference signals.

18. The method according to claim 1, wherein number of transmission beams in said selected subset of transmission beams is determined based on at least one of amount of available radio resources, amount of available baseband resources, or angular spread.

19. The method according to claim 1, wherein transmission beams in said selected subset of transmission beams are determined per subcarrier, per resource block, and/or per wireless device.

20. A method for precoding over a beam subset, the method being performed by a wireless device, the method comprising:
performing one of the following two steps:
(i) receiving a first set of reference signals, wherein the first set of reference signals was transmitted from a network node using a set of transmission beams and after receiving the first set of reference signals, transmitting toward the network node first feedback information of the first set of reference signals received at the wireless device, and
(ii) transmitting toward the network node a second set of reference signals;
receiving data transmission from said network node using a subset of transmission beams selected from said set of transmission beams, wherein
said subset of transmission beams is selected from said set of transmission beams by said network node based on the first feedback information received at the network node or based on the second set of reference signals received at the network node using the set of transmission beams, and
precoding weights for at least a portion of said subset of transmission beams are determined based on the first feedback information or the second set of reference signals.

21. The method according to claim 20, the method comprising:
receiving the first set of reference signals, wherein the first set of reference signals was transmitted from the network node using the set of transmission beams; and
after receiving the first set of reference signals, transmitting toward the network node the first feedback information of said first set of reference signals received at the wireless device,
wherein said subset of transmission beams is selected from said set of transmission beams based on the first feedback information received at the network node.

22. The method according to claim 21, the method further comprising:
receiving a third set of reference signals, wherein the third set of reference signals was transmitted from the network node using the subset of transmission beams; and
after receiving the third set of reference signals, transmitting toward the network node second feedback information of said third set of reference signals received at the wireless device,
wherein said precoding weights are determined based on said second feedback information.

23. The method according to claim 22, wherein said third set of reference signals is received more densely in time and/or frequency than said first set of reference signals.

24. The method according to claim 22, wherein said third set of reference signals is weighted according to said first feedback information.

25. The method according to claim 22, wherein any of said first feedback information and said second feedback information comprises a precoding matrix indicator (PMI) which is based on the received first and/or third set of reference signals and a codebook known to the network node.

26. The method according to claim 20, the method comprising:
transmitting the second set of reference signals, said subset of transmission beams being selected from said set of transmission beams based on the second set of reference signals.

27. The method according to claim 26, the method comprising:
transmitting toward the network node a third set of reference signals, said precoding weights being determined based on the third set of reference signals.

28. A network node for precoding over a beam subset, the network node comprising processing circuitry, the processing circuitry being configured to cause the network node to:

perform one of the following two steps:
- (i) transmitting toward a wireless device a first set of reference signals using a set of transmission beams and after transmitting the first set of reference signals, receiving first feedback information of the first set of reference signals received at the wireless device, wherein the first feedback information was transmitted from the wireless device, and
- (ii) receiving a second set of reference signals using the set of transmission beams, wherein the second set of reference signals was transmitted from the wireless device;

based on the received first feedback information or the received second set of reference signals, select a subset of transmission beams from said set of transmission beams to be used for communication with said wireless device; and determine precoding weights for at least a portion of said selected subset of transmission beams based on the received first feedback information or the received second set of reference signals.

29. The network node according to claim 28, wherein said first feedback information is determined based on characteristics of said first set of reference signals received at the wireless device.

30. The network node according to claim 28, wherein receiving the second set of reference signals comprises receiving sounding reference signals (SRS) and measuring signal quality of the SRS in different reception beams of said network node.

31. A wireless device for precoding over a beam subset, the wireless device comprising processing circuitry, the processing circuitry being configured to cause the wireless device to:

perform one of the following two steps:
- (i) receiving a first set of reference signals, wherein the first set of reference signals was transmitted from a network node using a set of transmission beams and after receiving the first set of reference signals, transmitting toward the network node first feedback information of the first set of reference signals received at the wireless device, and
- (ii) transmitting toward the network node a second set of reference signals; and receive data transmission from said network node using a subset of transmission beams selected from said set of transmission beams, wherein said subset of transmission beams is selected from said set of transmission beams by said network node based on the first feedback information received at the network node or based on the second set of reference signals received at the network node using the set of transmission beams, and precoding weights for at least a portion of said subset of transmission beams are determined based on the first feedback information or the second set of reference signals.

32. The wireless device according to claim 31, wherein said first feedback information is determined based on characteristics of said first set of reference signals received at the wireless device.

33. The wireless device according to claim 31, wherein transmitting the second set of reference signals comprises transmitting sounding reference signals (SRS), and signal quality of the SRS is measured in different reception beams of said network node.

34. A computer program product comprising a non-transitory computer readable medium storing a computer program for precoding over a beam subset, the computer program comprising computer code which, when run on processing circuitry of a network node, causes the network node to:

perform one of the following two steps:
- (i) transmitting toward a wireless device a first set of reference signals using a set of transmission beams and after transmitting the first set of reference signals, receiving first feedback information of the first set of reference signals received at the wireless device, wherein the first feedback information was transmitted from the wireless device, and
- (ii) receiving a second set of reference signals using the set of transmission beams, wherein the second set of reference signals was transmitted from the wireless device;

based on the received first feedback information or the received second set of reference signals, select a subset of transmission beams from said set of transmission beams to be used for communication with said wireless device; and determine precoding weights for at least a portion of said selected subset of transmission beams based on the received first feedback information or the received second set of reference signals.

35. A computer program product comprising a non-transitory computer readable medium storing a computer program for precoding over a beam subset, the computer program comprising computer code which, when run on processing circuitry of a wireless device, causes the wireless device to:

perform one of the following two steps:
- (i) receiving a first set of reference signals, wherein the first set of reference signals was transmitted from a network node using a set of transmission beams and after receiving the first set of reference signals, transmitting toward the network node first feedback information of the first set of reference signals received at the wireless device, and
- (ii) transmitting toward the network node a second set of reference signals; and receive data transmission from said network node using a subset of transmission beams selected from said set of transmission beams, wherein said subset of transmission beams is selected from said set of transmission beams by said network node based on the first feedback information received at the network node or based on the second set of reference signals received at the network node using the set of transmission beams, and precoding weights for at least a portion of said subset of transmission beams are determined based on the first feedback information or the second set of reference signals.

* * * * *